No. 711,791. Patented Oct. 21, 1902.
J. C. SMITH.
HANDLE FOR AGRICULTURAL TOOLS.
(Application filed Feb. 20, 1902.)
(No Model.) 2 Sheets—Sheet 2.
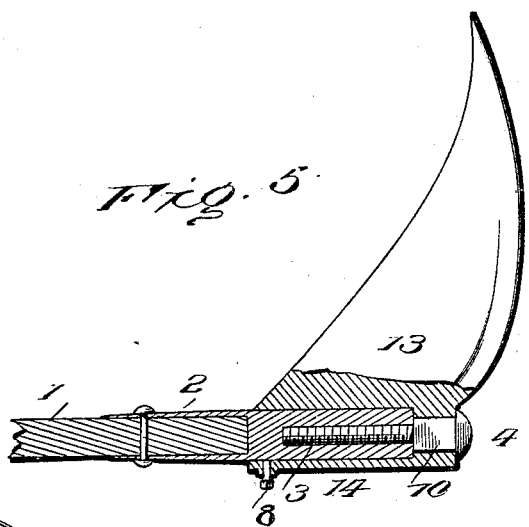
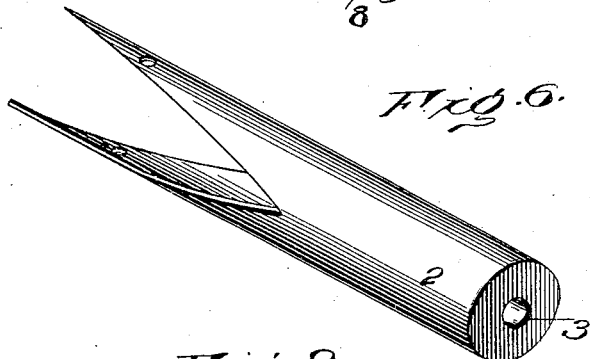
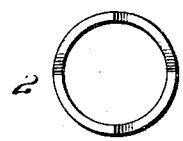
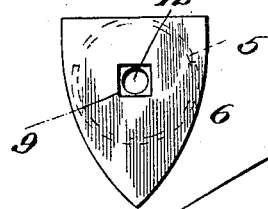
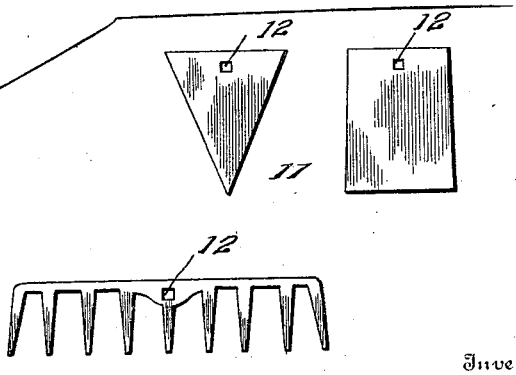
Witnesses
Inventor
J. C. Smith
By
Attorneys

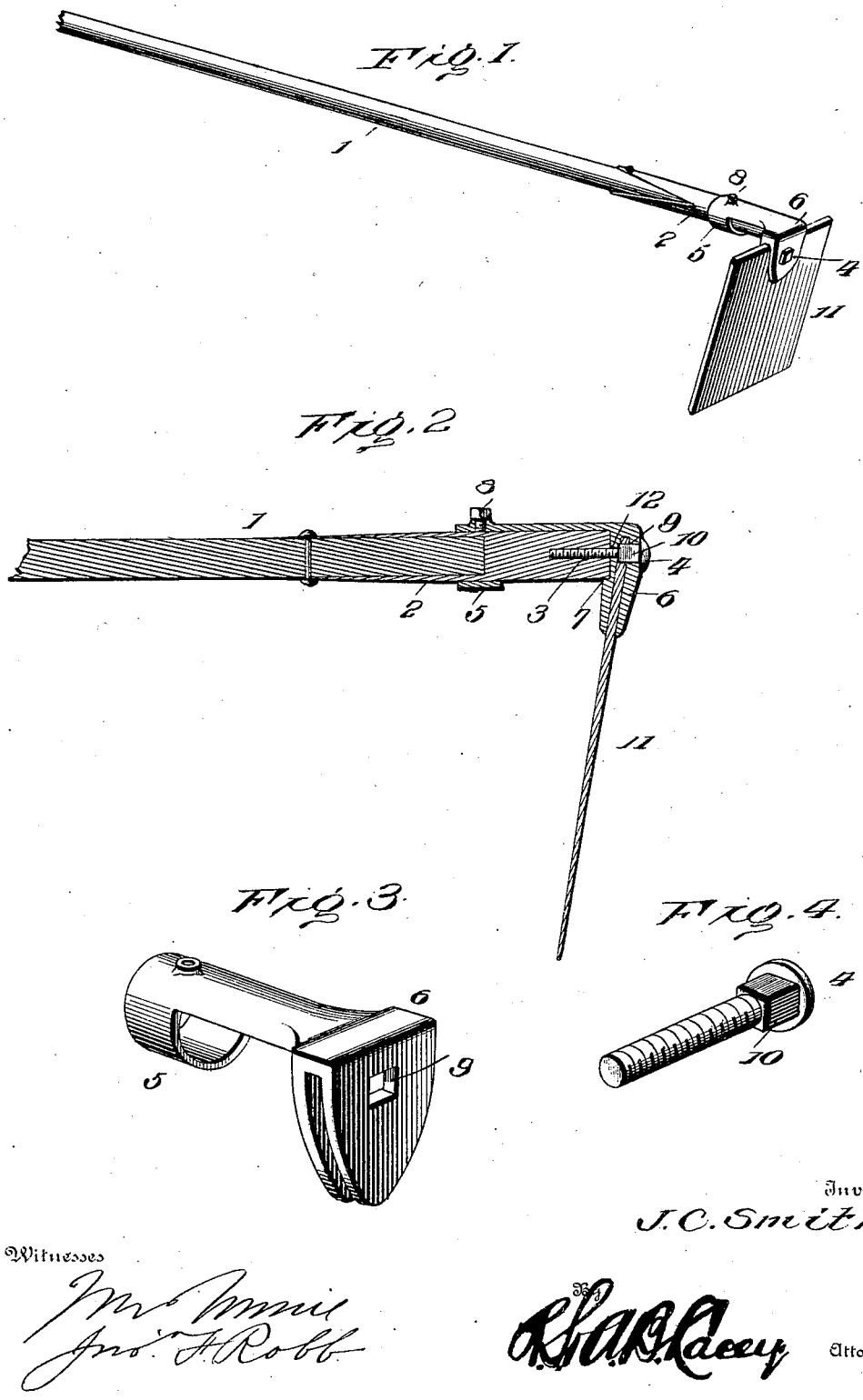

UNITED STATES PATENT OFFICE.

JOHN C. SMITH, OF MANGUM, NORTH CAROLINA.

HANDLE FOR AGRICULTURAL TOOLS.

SPECIFICATION forming part of Letters Patent No. 711,791, dated October 21, 1902.

Application filed February 20, 1902. Serial No. 94,982. (No model.)

*To all whom it may concern:*

Be it known that I, JOHN C. SMITH, a citizen of the United States, residing at Mangum, in the county of Richmond and State of North Carolina, have invented certain new and useful Improvements in Handles for Agricultural Tools; and I do hereby declare the following to be a full, clear, and exact description of the invention, such as will enable others skilled in the art to which it appertains to make and use the same.

In order to minimize the cost to the farmer or gardener and yet provide a number of tools each designed for a special work is the primary purpose of this invention, which consists, essentially, of a single handle, a plurality of blades or tool-heads, and means for detachably and firmly connecting any one of the blades or tool-heads to the handle. The invention also enables tools of this type to be economically shipped and stored.

The improvement deals most especially with the means coöperating with the handle and tool elements for securement of the latter to the handle, whereby slipping or displacement is wholly obviated.

For a full description of the invention and the merits thereof and also to acquire a knowledge of the details of construction of the means for effecting the result reference is to be had to the following description and drawings hereto attached.

While the essential and characteristic features of the invention are susceptible of modification, still the preferred embodiment of the invention is illustrated in the accompanying drawings, in which—

Figure 1 is a perspective view showing the invention applied to a hoe. Fig. 2 is a central longitudinal section thereof on a larger scale. Fig. 3 is a perspective view of the holder. Fig. 4 is a detail view of the bolt or fastening coöperating with the tip, holder, and tool element. Fig. 5 is a detail view showing the invention applied to a bush and brier blade. Fig. 6 is a detail view of the metal tip applied to the handle or pole. Fig. 7 is an end view of the handle-tip. Fig. 8 is an end view of the holder. Fig. 9 is a detail view of some of the tool elements adapted to be secured to the handle by means of the invention.

Corresponding and like parts are referred to in the following description and indicated in all the views of the drawings by the same reference characters.

The handle 1 is preferably of wood and may be of any length and the representative of the part to which a hoe-blade, rake, pitchfork, or the like tool element is secured. The metal tip 2 is forked at one end to receive the end of the handle or pole 1, to which it is riveted or otherwise rigidly attached, the projecting end being solid and having a threaded opening 3 to receive the bolt or fastening 4. The tool-holder is provided at one end with a cuff or sleeve 5 and at its opposite end with a clip 6, the cuff or sleeve being adapted to snugly fit upon the metal tip 2. A socket 7 is formed in the inner face of the clip 6 in line with the opening of the sleeve or cuff 5, so as to receive the outer end of the handle-tip 2, whereby the clip is more securely held in place. A clamp-screw 8 is threaded into a side opening of the holder and its inner end is adapted to bind against the handle-tip 2 and prevent turning of the clip when properly adjusted upon the said tip 2. A square opening 9 is provided in the outer portion of the clip to receive a square portion 10, adjacent to the head of the bolt or fastening 4, whereby said bolt is prevented from turning with reference to the holder when rotating the handle either to secure the tool or to loosen the same. The inner end of the slot of the clip in which the tool element 11 is fitted is of square form, so as to prevent any possible movement of the said tool when the parts are assembled and properly secured.

The holder is adapted for use in connection with tool elements of the variety substantially as shown in Fig. 9, said parts having a square opening 12 to receive the square portion 10 of the fastening 4, so as to prevent any turning of the holder, tool element, and fastening after the parts have been fitted together. The tool elements may be hoe-blades, rakes, and the like of various forms and sizes, according to the different kinds of farm work and gardening to be performed.

In the form of the tool element shown in Fig. 5 the blade 13 is provided with a sleeve 14 to fit upon the tip 2, said sleeve having a square opening at its outer end to receive the square portion 10 of the fastening and provided with a clamp-screw 8 for fastening the parts when in position.

In assembling the parts the tool element is fitted into the slot of the clip 6, and the fastening 4 is passed through the registering openings 9 and 12 of the tool elements, after which the handle-tip is thrust into the cuff or sleeve 5 and is turned to draw the parts together by screwing upon the threaded portion of the said part 4. When the handle is tightened, the clamp-screw 8 is turned up to bind against a side of the handle-tip 2, thereby preventing slipping or any displacement of the parts.

Having thus described the invention, what is claimed as new is—

1. In combination, a handle, a tool element, a sleeve coöperating with the handle and tool element and having a square opening at its outer end, a threaded fastening having a square portion to fit the square opening of the sleeve and making screw-thread connection with the handle, and securing means for preventing turning of the handle when tightened, substantially as set forth.

2. In combination, a handle, a holder detachably fitted to the handle and having a clip, a tool element detachably fitted to said clip, and a fastening for securing the tool element to the holder and the latter to the said handle, substantially as specified.

3. In combination, a handle, a holder having a sleeve at one end and a clip at the opposite end, the inner portion of the clip having a socket in line with the said sleeve, a tool element detachably fitted to the clip, and a fastening for connecting the tool element to the clip and the holder to the said handle, substantially as set forth.

4. In combination, a handle, a tool-holder detachably fitted to the handle and having a clip at its outer end and a substantially square opening, a tool element detachably fitted to the clip and having an opening of substantially square form, and a fastening for connecting the tool element to the holder and the latter to the handle, said fastening having an approximately square portion to enter the aforesaid square opening of the tool element and holder, substantially as and for the purpose specified.

5. In combination, a handle, a tool-holder detachably fitted to the handle and comprising a sleeve and a clip, the latter having a socket at its inner side and an approximately square opening at its outer side both in line with the sleeve, means for securing the holder to the handle, a tool element detachably fitted to the clip and having an approximately square opening, and a fastening for connecting the tool element to the clip and the holder to the handle, said fastening having an approximately square portion to fit within the square openings of the tool element and holder, substantially as set forth.

In testimony whereof I affix my signature in presence of two witnesses.

JOHN C. SMITH. [L. S.]

Witnesses:
JOS. A. LEAK,
R. W. CHANDLER.